United States Patent
Oellers

(10) Patent No.: US 6,257,563 B1
(45) Date of Patent: Jul. 10, 2001

(54) DAMPER FOR VEHICLE COMPONENTS

(75) Inventor: Hans-Gerd Oellers, Mönchengladbach (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/169,655

(22) Filed: Oct. 9, 1998

(30) Foreign Application Priority Data

Oct. 11, 1997 (EP) .................................................. 97117635

(51) Int. Cl.$^7$ .................................................. B60G 21/04
(52) U.S. Cl. .......................................... 267/189; 267/141.1
(58) Field of Search .......................... 267/33, 141, 140.3, 267/140.11, 140.12, 140.13, 141.1–141.3, 141.7, 140.5, 141.5, 186, 188, 189, 257, 276; 74/579 R, 582; 464/179, 180; 403/203, 225, 291; 180/430

(56) References Cited

U.S. PATENT DOCUMENTS

| | | |
|---|---|---|
| 1,703,592 | 2/1929 | Paton . |
| 2,772,104 | 11/1956 | Thiry . |
| 3,300,257 | 1/1967 | Selker et al. . |
| 3,392,971 | 7/1968 | Herbenar et al. . |
| 3,781,073 | 12/1973 | Jorn et al. . |
| 5,286,014 * | 2/1994 | Chakko ................. 267/293 |
| 5,544,715 | 8/1996 | Phillips . |
| 5,984,283 * | 11/1999 | Tsuiki ...................... 267/33 |

FOREIGN PATENT DOCUMENTS

| | | |
|---|---|---|
| 886983 | 8/1953 | (DE) . |
| 0461492 | 12/1991 | (EP) . |
| 0483473 | 5/1992 | (EP) . |
| 407788 | 3/1934 | (GB) . |
| 466354 | 5/1937 | (GB) . |
| 2209716 | 5/1989 | (GB) . |
| 02144213 | 6/1990 | (JP) . |
| 08203669 | 10/1982 | (WO) . |

* cited by examiner

Primary Examiner—Christopher P. Schwartz
Assistant Examiner—C. T. Bartz
(74) Attorney, Agent, or Firm—Tarolli, Sundheim, Covell, Tummino & Szabo L.L.P.

(57) ABSTRACT

The invention relates to a damper for vehicle components, particularly motor vehicle components such as steering tie rods and antiroll bar struts, with an elastic unit that is loaded in substantially axial direction of the component. To create a damper that will require little space but exhibit high reliability and a long service life and to permit a modular assembly from structurally simple and inexpensively producible parts for different applications, the elastic unit comprises at least two elastic elements 30 that are reciprocally, substantially pressure loaded and are disposed inside a housing (10) between the housing (10) and a coupling element (20) which transfers compression forces in substantially axial direction. The elastic elements (30) counteract an inclination and a coaxial offset of coupling element (20) with respect to the longitudinal axis of housing (10).

20 Claims, 4 Drawing Sheets

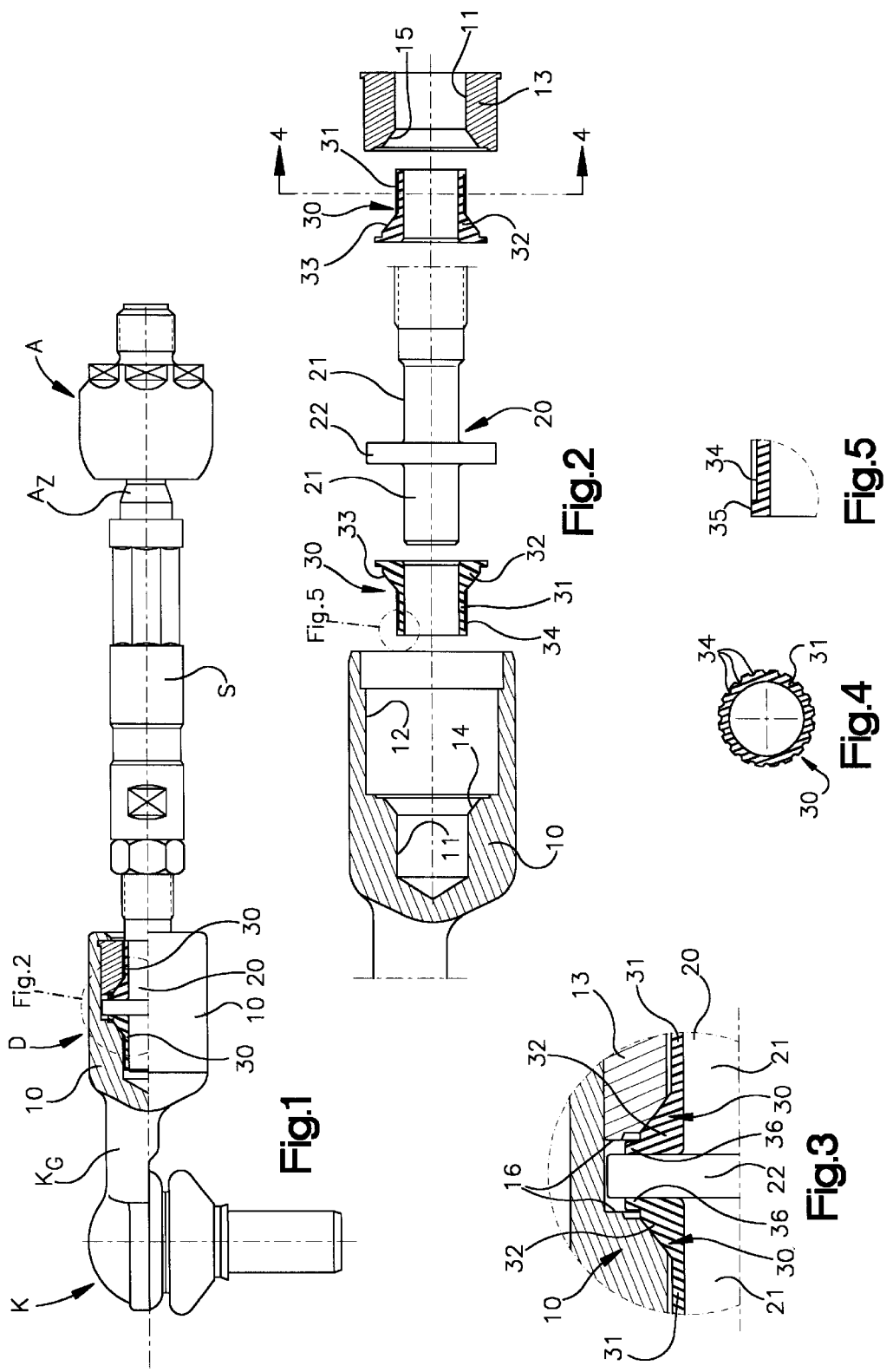

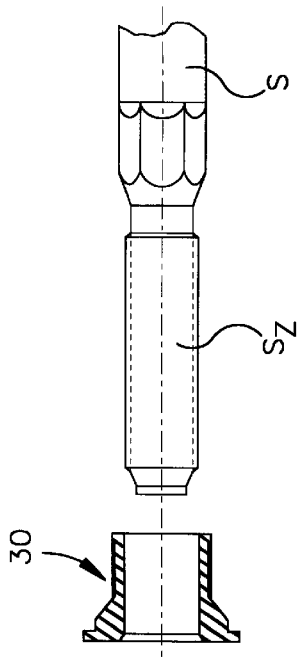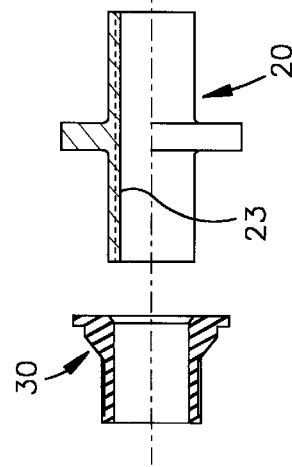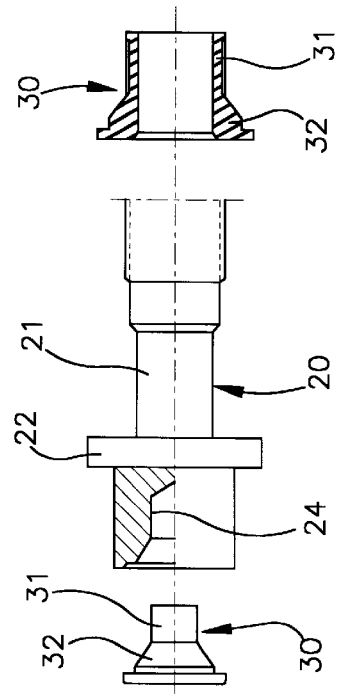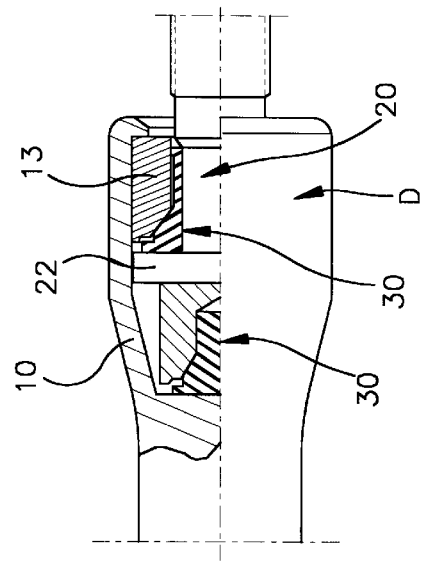

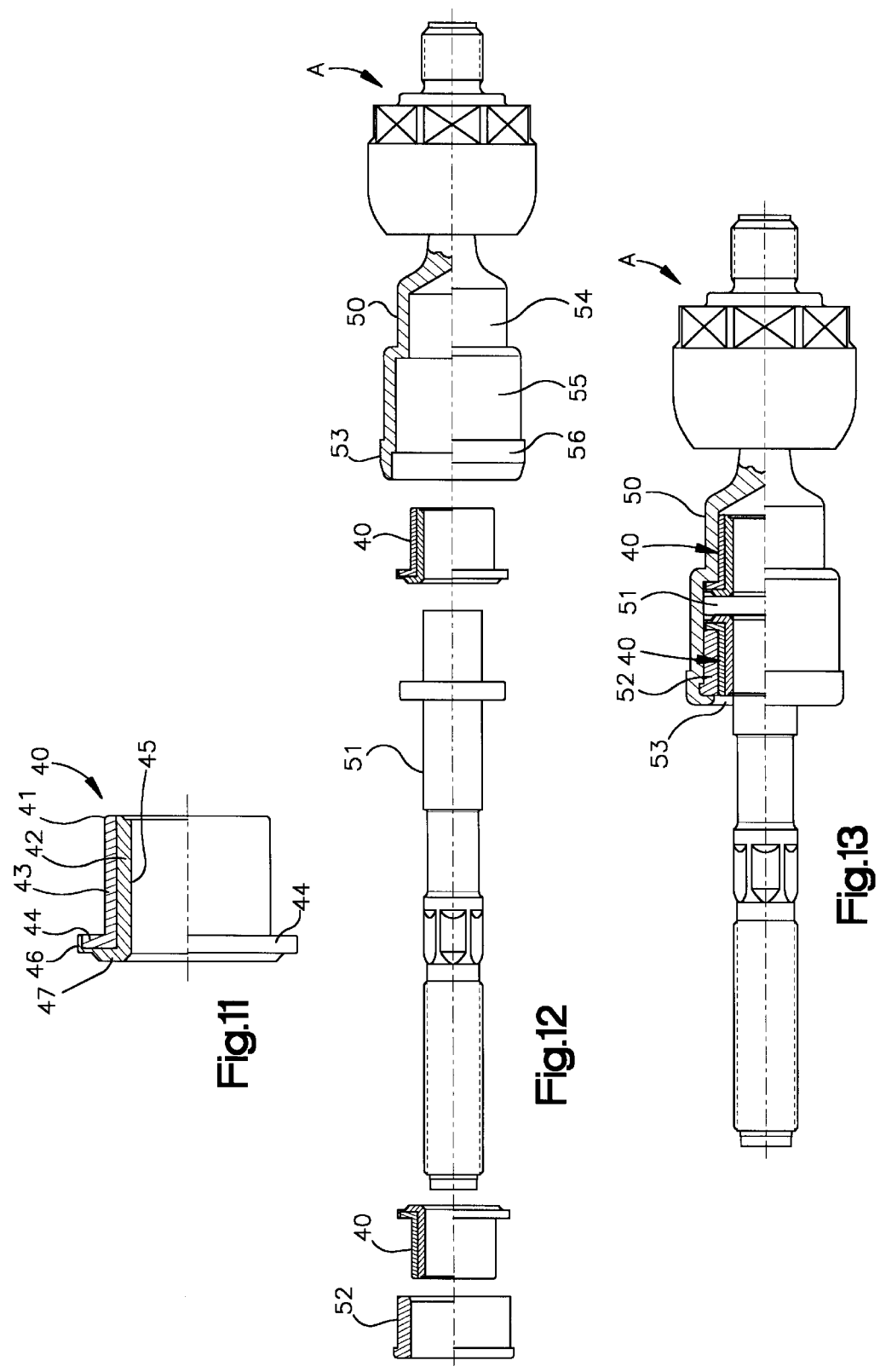

DAMPER FOR VEHICLE COMPONENTS

FIELD OF THE INVENTION

The invention relates to a damper for vehicle components, particularly motor vehicle components such as steering tie rods and antiroll bars, having an elastic unit that is loaded in substantially axial direction of the component.

BACKGROUND OF THE INVENTION

Particularly in the case of motor vehicle steering tie rods and antiroll bars, it is known to provide these chassis components with an elastic unit having a damper function. The elastic unit is loaded in substantially axial direction and thus permits limited axial travel, particularly to reduce or compensate any application of a sudden load. The damping of shocks introduced in the corresponding chassis component substantially reduces wear. Mounting the dampers on steering tie rods reduces steering susceptibility to shocks, reduces or compensates noise transmission, and provides a softer steering response. The market share of hydraulic and electrohydraulic assisted steering systems is increasing. Dampers will substantially reduce wear in the ball-and-socket joints of steering tie rods, racks, pinions, and the entire bearing, irrespective of whether the damper units are used in connection with axial or ball-and-socket joints.

In addition to their use for motor vehicle chassis components, these dampers may be used for general vehicle components such as the elastic suspension of motors and structural components, for example driver's cabs.

The prior art elastic units used as dampers have been formed by rubber-metal elements whose elastic parts are connected with the metal parts in such a way that the elastic parts are essentially subject to thrust loads. These known rubber-metal elements have the disadvantage that increased loads, particularly continuous loads, may cause the connection between metal and elastic parts to be loosened so that the dampers become ineffective.

To exclude these disadvantages as far as possible, the connecting surfaces between the metal and elastic components of the prior art rubber-metal elements must be made correspondingly large, which frequently causes space and installation-related problems. A further disadvantage of the prior art rubber-metal elements is that the application of a protective surface coating such as anode/cathode dip coating is limited because the related high temperatures would destroy the elastic elements and their bond with the metal elements. The coating of the metal parts is also limited because such coatings do not form a suitable bonding base for the elastic element. The bonding surface would therefore have to be reproduced after coating, which would entail additional costs.

The object of the invention is to create a damper of the above described type, which may be modularly assembled from simply designed and inexpensively producible separate parts for different applications and which requires little space and yet is distinguished by high reliability and a long component life.

SUMMARY OF THE INVENTION

The invention attains this object by providing a elastic unit comprising at least two elastic elements, which are reciprocally, substantially pressure loaded and arranged inside a housing between the housing and a coupling element that transfers pressure forces in substantially axial direction and which counteract any inclination or coaxial offset of the coupling element with respect to the longitudinal axis of the housing.

This embodiment of the elastic unit according to the invention creates a damper whose modular structure permits simple adaptation to the respective application. The stiffness of the elastic elements may be controlled not only by their dimensions but also by the Shore hardness of the respectively used materials, so that the respective elastic stiffness may be selected over a wide range without changing the geometry of the components. The protective surface coating of the metal parts may be freely selected to meet the respective requirements since there is no prior or subsequent rigid connection between the elastic elements on the one hand and the housing or coupling element on the other hand. The two elastic elements are reciprocally, substantially compressed and thus need not be rigidly connected to the metal parts but may instead be loosely arranged between the housing and the coupling element. Furthermore, the fact that the damper according to the invention lacks a rigid connection between the elastic elements and the housing or coupling element permits a space saving design. Consequently, the dampers are suitable even if space is limited, particularly for chassis components associated with motor vehicle steering systems taking into account the steering geometry. Finally, due to their compact structure, the dampers according to the invention are usable in connection with both axial and ball-and-socket joints.

According to an additional characteristic of the invention, the elastic elements are disposed in form-fitting manner as loose components between housing and coupling element. This permits a modular construction for the damper according to the invention so that it may be adapted to the respective application by selecting the corresponding module, particularly by selecting elastic elements that are made of a specific material.

According to a further characteristic of the invention, each elastic element includes a component that provides radial support of the coupling element in the housing and a component that permits an axial load transfer. In a preferred embodiment according to the invention, the elastic element component that provides radial support of the coupling element in the housing is made as a hollow cylinder whose surface fits against a cylindrical bore in the housing into which projects the shank of the coupling element. According to the invention, the component of the elastic element that effects the axial load transfer, via a surface tapered in cross-section fits against a corresponding, opposite housing surface, whereby the cross section may be circular, hyperbolic, parabolic or elliptical. As an alternative to this characteristic of the invention, it is proposed that a tapered surface of the elastic element component that effects the axial load transfer fit against a corresponding, opposite housing surface.

To permit greater manufacturing tolerances and to facilitate assembly, the hollow-cylinder elastic element component according to the invention may be provided with recesses that are preferably made as axially, annularly or helically extending grooves. This increases the compressibility of the elastic element both during assembly and in its mounted position. To prevent dirt from entering the recesses that are preferably formed as grooves, these grooves terminate at a distance from the end face of the elastic element to form an annular sealing lip.

According to an advantageous proposal of the invention, the elastic element comprises at least two parts. One part is preferably a supporting bush made, for example, of steel, aluminum or the like, in which is inserted a rubber element forming the second part. The bush is essentially a hollow cylinder and is provided at one end with an exterior circumferential collar. The rubber element fits tightly against the cylindrical area of the bush and completely overlaps the collar disposed at one end, whereby at least the area of the collar facing away from the rest of the bush in axial direction is overlapped and framed completely by the rubber element. Advantageously, the portion of the rubber-elastic element disposed on the collar in axial direction is formed in the manner of a compression spring, that is, as a thickened rubber area that absorbs compression forces. A distinguishing feature of the elastic element according to the invention is its simple and economical production and its simple application. Using a supporting bush with a cylindrical area and collar makes it possible to realize both the radial support and the axial mounting in a very simple manner so that the housing may also be designed very simply.

In a preferred embodiment of the invention, the coupling element is bolt-shaped with shanks effecting the radial support in the housing and a flange ring with an enlarged diameter to fit against the elastic element components effecting the axial load transfer. According to the invention, the flange ring of the coupling element is located between stop faces of the housing spaced at a distance from each other. This distance between the stop faces is greater than the axial thickness of the flange ring so that a short path results in axial direction of the damper.

To dampen the occurring motion, according to a further characteristic of the invention, each elastic element is provided with extensions that protrude into the clearance between the stop faces of the housing and are preferably formed as a closed ring. These extensions of the elastic element subject to compressive stress must be compressed before the flange ring of the coupling element will contact the corresponding stop face of the housing.

The invention finally proposes to make the housing in two parts with a base part to receive the coupling element and a sealing part to seal the base. This simplifies production and mounting of the damper. A further, inventory-related simplification is achieved if the two elastic elements are designed identically.

According to the invention, the housing and/or coupling element may form an integral part of a vehicle component or may be provided with a direct connection for a vehicle component.

BRIEF DESCRIPTION OF THE DRAWINGS

The drawing depicts various exemplary embodiments of the damper according to the invention.

FIG. 1 shows a steering tie rod provided with a damper according to the invention.

FIG. 2 is an enlarged exploded view of the damper shown in FIG. 1 in cross-section.

FIG. 3 is an enlarged detail view of FIG. 1.

FIG. 4 is a cross-section along line IV—IV in FIG. 2.

FIG. 5 is an enlarged detail view of FIG. 2.

FIG. 8 is a variant embodiment of a coupling element intended for a damper according to the invention.

FIG. 9 is half of a longitudinal section through a modified embodiment of a damper according to the invention.

FIG. 10 is an exploded view showing the two elastic elements and the coupling element of the damper according to FIG. 9.

FIG. 11 shows an alternative embodiment of an elastic element.

FIG. 12 is an exploded view of a partial section of an assembly using the elastic element shown in FIG. 11.

FIG. 13 shows the unit of FIG. 12 in its mounted state.

DETAILED DESCRIPTION OF THE INVENTION

The steering tie rod shown in side view in FIG. 1 comprises a ball-and-socket joint K and an axial joint A, both known per se. The link pin $A_Z$ of axial joint A is adjustably connected with joint housing $K_G$ of ball-and-socket joint K by a rod unit S.

Figure 6:
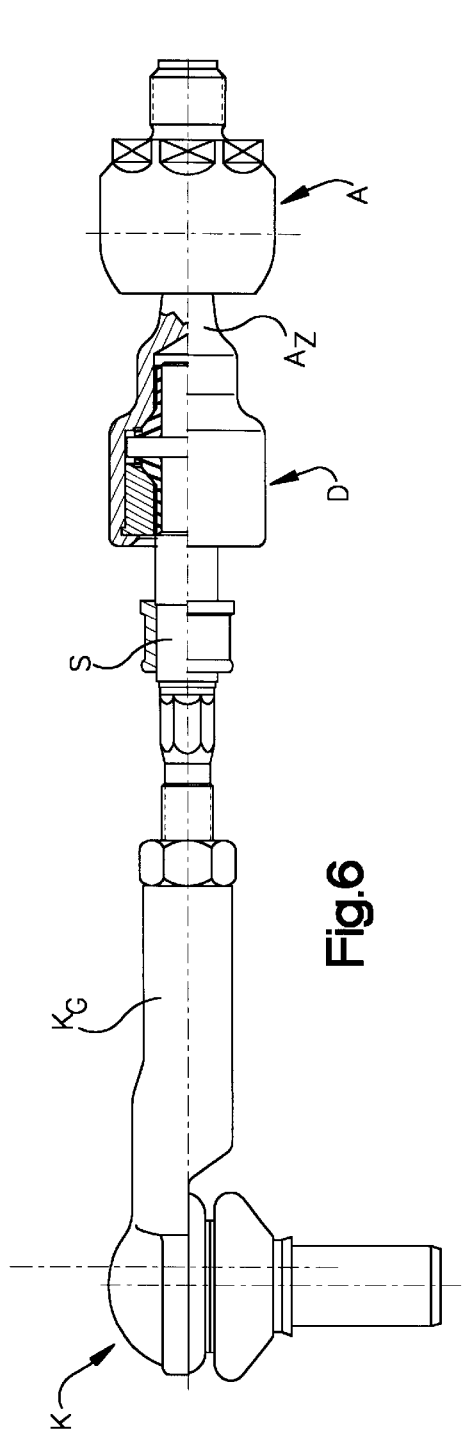
FIG. 6 is a second embodiment of a steering tie rod provided with a damper according to the invention.

In the embodiment of the steering tie rod according to FIG. 1, a damper D is formed onto the joint housing $K_G$ of ball-and-socket joint K, which is described below. According to the second embodiment of a steering tie rod, shown in FIG. 6, this damper D may also be formed onto link pin $A_Z$ of the axial joint A. The structure and action of damper D in FIGS. 1 and 6 are otherwise identical.

As is evident particularly in the exploded view of FIG. 2, damper D comprises a housing 10, a coupling element 20, and two elastic elements 30. These elastic elements 30 are designed identically in the first embodiment and are inserted as loose components between housing 10 and coupling element 20. In the first embodiment, housing 10 of damper D forms a one-piece unit together with joint housing $K_G$ of ball-and-socket joint K. A threaded rod integral with coupling element 20 connects coupling element 20 with rod unit S of the steering tie rod.

Each elastic element comprises a component 31 that effects radial support of coupling element 20 in housing 10 and a component 32 that permits an axial load transfer. In the exemplary embodiment shown in FIGS. 1 through 5, component 31 is made as a hollow cylinder whose surface fits against a cylindrical bore 11 of housing 10, into which projects a cylindrical shank 21 of coupling element 20. Coupling element 20 is provided with two such shanks 21 facing in opposite directions, between which a flange ring 22 with an enlarged diameter is formed. To accommodate this flange ring 22, housing 10 has a bore 12 with a larger diameter. In the first embodiment, housing 10 comprises a base part with bores 11 and 12 and a sealing part 13. Sealing part 13 is inserted into bore 12 and is secured against slipping out of the base part after mounting of damper D by a flanging of the housing edge as shown in the sectional view of FIG. 1.

The two elastic elements 30 of the first exemplary embodiment are identical. They are mounted on shanks 21 of coupling element 20 such that the end faces of their components 32 permitting an axial load transfer fit against flange ring 22 of coupling element 20, as shown in FIG. 1 and, in particular, in the enlarged detail view of FIG. 3. The coupling element provided with the two elastic elements 30 is then inserted into housing 10 and sealed by sealing part 13. In the exemplary embodiment, the elastic elements 30 are provided with a tapered surface 33 that fits against a corresponding tapered surface 14 of the base part of housing 10 and against a tapered surface 15 of the sealing part 13, respectively, preferably in such a way as to achieve an initial stress obtained by selecting appropriate dimensions.

To obviate the necessity for tight manufacturing tolerances and permit both a certain inclination of the coupling element 20 with respect to the longitudinal axis of housing 10 and a small paraxial offset between coupling element 20 and housing 10, the first embodiment provides for recesses in the cylindrical surface of component 31 of each elastic element 30 effecting the radial support of coupling element 20 in housing 10. In the exemplary embodiment, these recesses are shaped as axial grooves 34, as may be seen, in particular, in the cross section of FIG. 4. To prevent dirt from entering these axial grooves 34 from the outside, axial grooves 34 terminate at a distance from the end face of component 31 of elastic element 30 so as to form an annular sealing lip 35. This is most readily evident in the detail view of FIG. 5.

The enlarged view in FIG. 3 finally shows that the base part of housing 10 and the sealing part 13 form stop faces 16, which are spaced apart from each other by a distance exceeding the axial thickness of flange ring 22 of coupling element 20. This permits coupling element 20 to move within housing 10 in substantially axial direction. To achieve a predetermined damping action when such movements occur, both elastic elements 30, in the area of their component 32, are provided with extensions projecting into the clearance between stop faces 16, which in the exemplary embodiment form a closed ring 36. A relative motion of flange ring 22 in substantially axial direction toward one of stop faces 16 thus initially causes a compression of component 32 of the prestressed component 32 [sic] of the respective elastic element 30, which is approximately linear in its progression. Only when ring 36 of the respective compressed elastic element 30 sits between stop face 16 and flange ring 22, there is a progressive increase in the elastic stiffness until flange ring 22 immediately contacts the respective stop face 16. This prevents shocks in axial direction. Mounting the elastic element 30 under pretension furthermore has the effect of returning the coupling element 20 to its center position after the pressure is relieved.

Since the elastic elements 30 are loose components inserted between housing 10 and coupling element 20, any type of surface protection may be applied to housing 10 and coupling element 20 without taking into consideration a rigid connection between elastic elements 30 on the one hand and housing 10 or coupling element 20 on the other hand. By appropriate selection of the dimensions and the material of elastic element 30, damper D can thus be readily adapted to the respective application.

Figure 7:
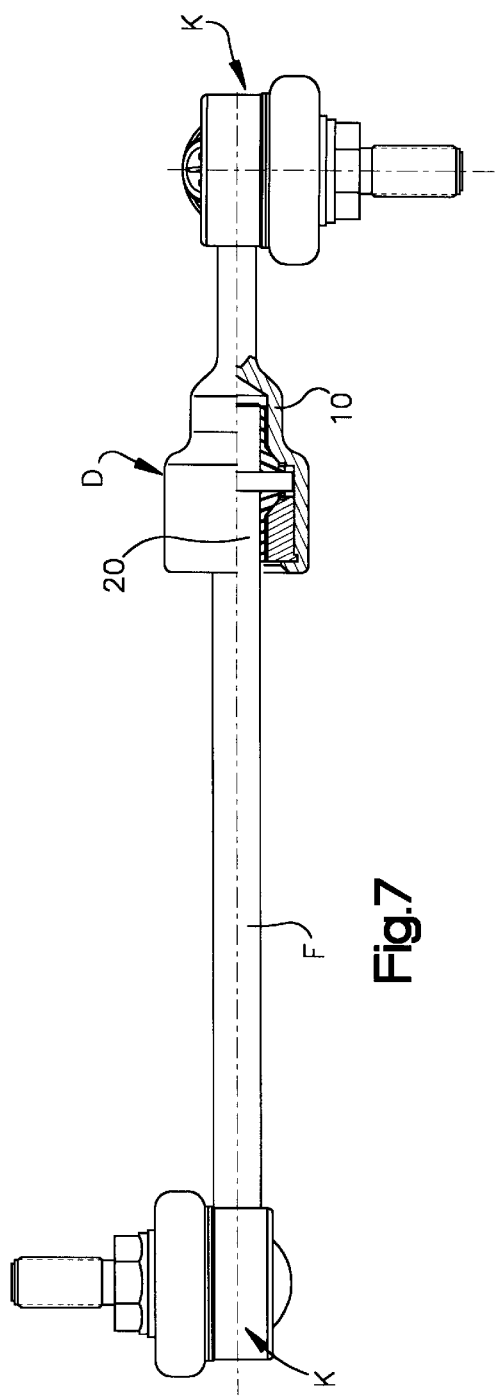
FIG. 7 is an exemplary embodiment of a chassis strut provided with a damper according to the invention.

In the first exemplary embodiment illustrated by FIGS. 1 through 5, damper D forms an integral component of a ball-and-socket joint K associated with the steering tie rod. FIG. 6, on the other hand, shows a steering tie rod where damper D forms an integral component with link pin $A_Z$ of axial joint A. FIG. 7 shows an embodiment with a chassis strut F provided at its two ends with a ball-and-socket joint K, respectively. In this embodiment, damper D with housing 10 is formed onto the housing of one ball-and-socket joint K and a coupling element 20 is formed onto chassis strut F. The other components of damper D correspond to the previously discussed components of the embodiment shown in FIGS. 1 through 5.

In the exemplary embodiment shown in FIG. 8, a damper coupling element 20 is provided with a threaded through-hole 23 to receive a threaded stem $S_Z$ of a rod unit S. In this embodiment, the two elastic elements 30 are identical. Their design corresponds to that described with reference to the first exemplary embodiment.

Finally, FIGS. 9 and 10 show an additional embodiment of a damper D wherein the two elastic elements 30 differ from each other. Elastic element 30 shown on the left in the exploded view of FIG. 10 is a full-walled element with smaller dimensions than the other elastic element 30, which is provided with a through-hole as described above. In this embodiment each elastic element is again provided with a component 31 effecting a radial support of coupling element 20 in housing 10 and a component 32 for the axial load transfer. In this embodiment, tapered surfaces are again provided for the respective elastic element 30 to fit against housing 10 and against sealing part 13, respectively. Instead of two shanks 21, however, the coupling element 20 of this embodiment has only one shank 21. The other shank is replaced by a blind hole 24 on the other side of flange ring 22, into which projects cylindrical component 31 of the smaller elastic element 30 for radial support of coupling element 20 in housing 10.

FIG. 11 shows an alternative embodiment of an elastic element. This element is made in two parts and comprises a supporting bush 41 made of steel, aluminum or the like and a rubber element 42. Bush 41 has a cylindrical area 43 that is provided with a collar 44 on one side. Rubber element 42 is inserted in form-fitting manner in supporting bush 41 and is provided with a cylindrical area extending over the axial length of the supporting bush, which in the area of the collar has a collar projection 46 that completely overlaps the collar. A part 47 of rubber element 42 absorbing axial forces in the manner of a compression spring is attached to the collar in axial direction. FIGS. 12 and 13 show the mounting area for the elastic element according to FIG. 11, whereby a damper housing 50 is disposed directly adjacent to an axial joint A. This housing has a first hollow cylinder area 54 in which an elastic element 40 may be inserted. Coupling element 51 is then inserted as described above and an elastic element is mounted from the other side. The use of supporting bush 41, which provides the elastic element with a substantially perpendicular collar projection, greatly simplifies the assembly for the absorption of axial forces. After mounting, the second elastic element 40 is overlapped by a mounting bush 52, which has a collar projection and is inserted into a third hollow-cylinder area 56. Thus elastic elements 40 in hollow-cylinder areas 54, 55, together with mounting bush 52, are optimally positioned in axial direction with respect to each other and, at the same time, are optimally radially supported. The projection of damper housing 50 forming the hollow-cylinder area 56 is provided with a projecting flanged edge that is subsequently pressed in. The assembled state is shown in FIG. 13.

What is claimed is:
1. A damper for vehicle components comprising:
an elastic unit loaded substantially in an axial direction, the elastic unit comprising at least two reciprocally and substantially compressed elastic elements (30), the elastic elements (30) being disposed inside a housing (10) and separating the housing (10) from a coupling element (20), the coupling element (20) transmitting compression forces to the elastic elements in a substantially axial direction,
each elastic element (30) having two regions (32, 36, 46, 47) to absorb the axial compression forces transmitted by the coupling element (20), each of the regions having a force transmission surface for receiving the compression force from the coupling element,
a first region (32, 47) of one elastic element (30) being compressed when the coupling element (20) begins to transmit an axial compression force to the one elastic element, a second region (36, 46) of the one elastic element (30) being compressed only when the axial compression force transmitted to the one elastic element by the coupling element (20) exceeds a certain amount, the elastic elements (30) further providing radial support to a shank (21) of the coupling element (20) with respect to a longitudinal axis of the housing (10).

2. Damper according to claim 1 characterized in that the elastic elements (30) are disposed as loose components in form-fitting manner between housing (10) and coupling element (20).

3. Damper according to claim 1 characterized in that each elastic element (30) is provided with a component (31) effecting a radial support of coupling element (20) in housing (10) and a component (32) permitting an axial load transfer.

4. Damper according to claim 3 characterized in that the component (31) effecting radial support of the coupling element (20) in the housing (10) is designed as a hollow cylinder whose surface fits against a cylindrical bore (11) in the housing (10) into which projects the shank (21) of the coupling element (20).

5. Damper according to claim 3 characterized in that the component (32) of the elastic element (30) effecting the axial load transfer, via a surface (33) that is tapered in cross-section, fits against a corresponding opposite surface (14, 15) of housing (10).

6. Damper according to claim 3 characterized in that the component (32) of the elastic element (30) effecting the axial load transfer, via a tapered surface (33), fits against a corresponding opposite surface (14, 15) of housing (10).

7. Damper according to claim 4 characterized in that the hollow-cylinder component (31) of the elastic element (30) is provided with recesses (34).

8. Damper according to claim 7 characterized in that the recesses are made as grooves that extend axially, annularly, or helically (34).

9. Damper according to claim 8 characterized in that the grooves (34) terminate at a distance from the end face of the elastic element (30) to form an annular sealing lip (35).

10. Damper according to claim 1 characterized in that the coupling element (20) is bolt-shaped with the shank (21) effecting radial support in the housing (10) and a flange ring (22) with enlarged diameter to support the components (32) of the elastic elements (30) effecting the axial load transfer.

11. Damper according to claim 10 characterized in that the flange ring (22) of the coupling element (20) is disposed between the stop faces (16) of the housing (10), which are spaced at a distance from each other, whereby the distance between the stop faces (16) is greater than the axial thickness of the flange ring (22).

12. Damper according to claim 11 characterized in that each elastic element (30) is provided with extensions (36) projecting into the clearance between the stop faces (16) of the housing (10).

13. Damper according to claim 12 characterized in that the extensions are formed as a closed ring (36).

14. Damper according to claim 1 characterized in that the housing (10) is a two-part unit comprising a base part to receive the coupling element (20) and a sealing part (13) to seal the base part.

15. Damper according to claim 1 characterized in that the two elastic elements (30) are identical.

16. Damper according to claim 1 characterized in that at least one of the housing (10) and the coupling element (20) are formed as an integral part of a vehicle component or are provided with a direct connection to a vehicle component.

17. A damper for vehicle components comprising:

an elastic unit loaded substantially in an axial direction, the elastic unit comprising at least two reciprocally and substantially compressed elastic elements (30), the elastic elements (30) being disposed inside a housing (10) and separating the housing (10) from a coupling element (20), the coupling element (20) transmitting compression forces in a substantially axial direction, each elastic element (30) having two regions (32, 36, 46, 47) with force absorption surfaces to absorb the axial compression forces transmitted by the coupling element (20), force transmission surfaces of a first region (32, 47) of an elastic element (30) being compressed when the coupling element (20) begins to transmit an axial compression force, force transmission surfaces of a second region (36, 46) of the elastic element (30) being compressed only when the axial compression force transmitted by the coupling element (20) exceeds a certain amount, the elastic elements (30) counteracting an inclination and a coaxial offset of the coupling element (20) with respect to a longitudinal axis of the housing (10), each elastic element (30) further comprising a supporting bush (41) and a rubber element (42) inserted therein.

18. Damper according to claim 17 characterized in that the bush (41) has a cylindrical area (43) and a circumferential collar (44) at one end.

19. Damper according to claim 17 characterized in that the rubber element (42) has a cylindrical area (45) inserted in the cylindrical area (43) of the bush (41) and a collar projection (46) overlapping collar (44).

20. Damper according to claim 19 characterized in that the part (47) of the collar projection (46) disposed in axial direction on collar (44) absorbs axial compression forces.

* * * * *